US009852305B2

(12) United States Patent
Gajek

(10) Patent No.: US 9,852,305 B2
(45) Date of Patent: Dec. 26, 2017

(54) METHOD FOR PROVABLY SECURE ERASURE OF DATA

(71) Applicant: NEC EUROPE LTD., Heidelberg (DE)

(72) Inventor: Sebastian Gajek, Flensburg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/502,506

(22) PCT Filed: Oct. 21, 2015

(86) PCT No.: PCT/EP2015/074410
§ 371 (c)(1),
(2) Date: Feb. 8, 2017

(87) PCT Pub. No.: WO2016/062782
PCT Pub. Date: Apr. 28, 2016

(65) Prior Publication Data
US 2017/0228554 A1  Aug. 10, 2017

(30) Foreign Application Priority Data
Oct. 21, 2014 (EP) .................................... 14189655

(51) Int. Cl.
*H04L 29/06* (2006.01)
*G06F 21/62* (2013.01)
(Continued)

(52) U.S. Cl.
CPC ........ *G06F 21/6218* (2013.01); *G06F 3/0604* (2013.01); *G06F 3/0623* (2013.01);
(Continued)

(58) Field of Classification Search
CPC . H04L 9/3218; G06F 21/79; G06F 2212/7205
See application file for complete search history.

(56) References Cited

U.S. PATENT DOCUMENTS

| 2005/0289289 A1* | 12/2005 | Chang ................. G06F 21/6218 711/103 |
| 2015/0007337 A1* | 1/2015 | Krutzik .................. G06F 21/73 726/26 |
| 2015/0358321 A1* | 12/2015 | Udagawa ............ H04L 63/0442 713/176 |

OTHER PUBLICATIONS

Giuseppe Ateniese et al: "Proofs of Space: When Space is of the Essence", International Association for Cryptologic Research,, vol. 20140703:194705, Jul. 3, 2014 (Jul. 3, 2014), pp. 1-20, XP061016078.

(Continued)

*Primary Examiner* — Jason K Gee
(74) *Attorney, Agent, or Firm* — Leydig, Voit & Mayer, Ltd.

(57) ABSTRACT

A method for provably secure erasure of data, performed in a memory available to one or more computing devices, includes generating prover state information (PSI), verifier state information (VSI), and common reference information (CRI) based on security information, a pregiven time-constraint, and a pregiven space-constraint, the generating PSI, VSI, and CRI being performed interactively between a prover computing device (PCD), and a verifier computing device, (VCD); computing, by the VCD based on the VSI, a challenge; computing a proof-of-erasure (POE) by the PCD based on the PSI and the computed challenge, the POE having a size corresponding to the pregiven space-constraint; and verifying by the VCD based on the VSI and the POE.

14 Claims, 9 Drawing Sheets

---

Program Find

Input: A puzzle $puz = (t, x_0, x_1, z)$, a trapdoor $TK = (k_0^{k-k'}, k_1^{k-k'})$, and an upper bound on the key size $K' = 2^{k'}$
Output: A solution $s = (k_0, k_1)$ 1. Bootstrapp $T_0, T_1 = \emptyset$
2. For $1 \leq i \leq K'$:
   - set $T_0[i] = f^t_{i\|k_0^{k-k'}}(x_0)$
   - set $T_1[i] = f^t_{i\|k_1^{k-k'}}(x_1)$
3. Sort $T_0$ in growing order starting with the smallest value $y_0^1 = f^t_{i\|k_0^{k-k'}}(x_0)$ and $T_1$ in reverse order starting with the biggest value $y_1^1 = f^t_{i\|k_1^{k-k'}}(x_1)$.
4. Set $l, m = 1$. For $1 \leq l, m \leq K'$, do:
   - if $y_1^l + y_2^{m^k} > z$, increase $m = m + 1$
   - if $y_1^l + y_2^{m^k} < z$, increase $l = l + 1$
   - if $y_1^l + y_2^m = z$, return $T_0[l]$ and $T_1[m]$, and abort

(51) Int. Cl.
*G06F 21/60* (2013.01)
*G06F 3/06* (2006.01)

(52) U.S. Cl.
CPC ......... *G06F 3/0652* (2013.01); *G06F 3/0683* (2013.01); *G06F 21/602* (2013.01); *G06F 2221/2103* (2013.01); *G06F 2221/2143* (2013.01)

(56) References Cited

OTHER PUBLICATIONS

Nikolaos P. Karvelas et al: "Efficient Proofs of Secure Erasure" In: "Correct System Design", Jan. 1, 2014 (Jan. 1, 2014), Springer International Publishing, Cham 032548, XP55253384.
Eli Ben-Sasson et al: "Short Proofs May Be Spacious: An Optimal Separation of Space and Length in Resolution", Foundations of Computer Science, 2008. FOCS '08. IEEE 49th Annual IEEE Symposium On, IEEE, Piscataway, NJ, USA, Oct. 25, 2008 (Oct. 25, 2008), pp. 709-718, XP031367003.

* cited by examiner

| Security | Pre-Processing | | | | | Proof Generation | | | | |
|---|---|---|---|---|---|---|---|---|---|---|
| | Prover | | Verifier | | Rounds | Prover | | Verifier | | Rounds |
| | T | S | T | S | | T | S | T | S | |
| A | ROM | 1 | 1 | 1 | 1 | 1 | T | S | S | S | |
| B | ROM | $S \log S$ | $S$ | $\log^2 S$ | $\log S$ | 1 | $\log S$ | $S$ | 1 | 1 | 2 |
| C | ROM | $\kappa \cdot S \log S$ | $S$ | $S \log S$ | $S$ | 1 | $S$ | $S$ | $S$ | 1 | $\kappa$ |
| D | ROM | $S \log S$ | $S$ | 1 | 1 | 1 | $\log S$ | $S$ | $\log^2 S$ | $\log S$ | 2 |
| | OWF | 1 | 1 | 1 | 1 | 1 | $S \cdot \log S$ | $S$ | 1 | 1 | 2 |

Embodiment of the present invention

Fig. 5

Program Find

Input: A puzzle $puz = (t, x_0, x_1, z)$, a trapdoor $TK = (k_0^{k-k'}, k_1^{k-k'})$, and an upper bound on the key size $K' = 2^{k'}$.
Output: A solution $s = (k_0, k_1)$ 1. Bootstrapp $T_0, T_1 = \emptyset$
2. For $1 \leq i \leq K$:
   - set $T_0[i] = f_{i\|k_0}^{t}{}_{\leftarrow k'}(x_0)$
   - set $T_1[i] = f_{i\|k_1}^{t}{}_{\leftarrow k'}(x_1)$
3. Sort $T_0$ in growing order starting with the smallest value $y_0^1 = f_{i\|k_0^{k-k'}}^{t}(x_0)$ and $T_1$ in reverse order starting with the biggest value $y_1^1 = f_{i\|k_1^{k-k'}}^{t}(x_1)$.
4. Set $l, m = 1$. For $1 \leq l, m \leq K'$, do:
   - if $y_1^l + y_2^m > z$, increase $m = m + 1$
   - if $y_1^l + y_2^m < z$, increase $l = l + 1$
   - if $y_1^l + y_2^m = z$, return $T_0[l]$ and $T_1[m]$, and abort

Fig. 7

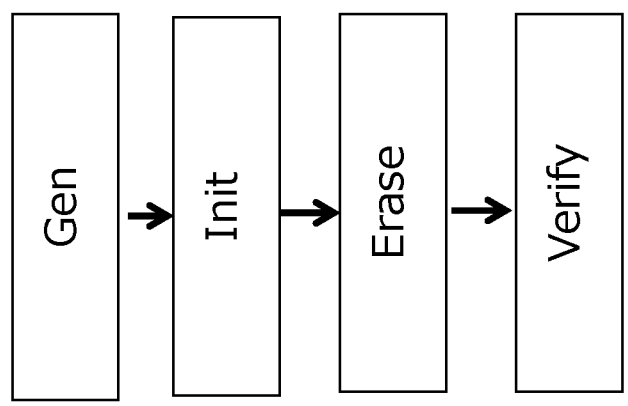

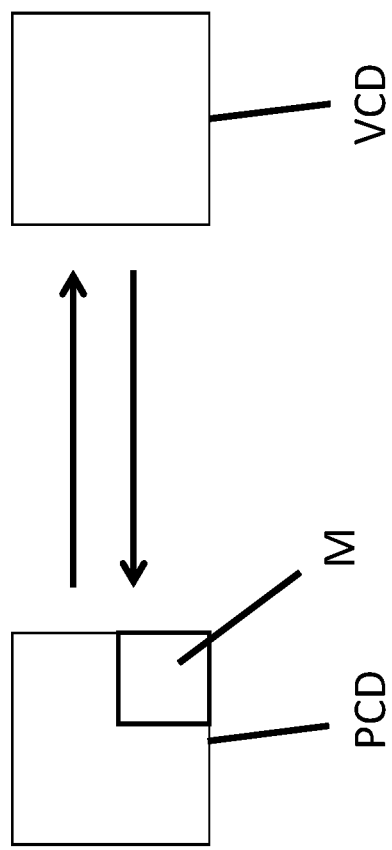

METHOD FOR PROVABLY SECURE ERASURE OF DATA

CROSS REFERENCE TO RELATED APPLICATIONS

This application is a U.S. National Stage Application under 35 U.S.C. §371 of International Application No. PCT/EP2015/074410 filed on Oct. 21, 2015, and claims benefit to European Patent Application No. 14189655.5 filed on Oct. 21, 2014. The International Application was published in English on Apr. 28, 2016 as WO 2016/062782 A2 under PCT Article 21(2). European Patent Application No. 14189655.5 is incorporated by reference herein.

FIELD

The present invention relates to a method for provably secure erasure of data performed in a memory available to one or more computing devices. The present invention further relates to a system for provably secure erasure of data comprising a prover computing device, 'PCD', and a verifier computing device, 'VCD'. The present invention further relates to a verifier computing device, 'VCD', for verifying secure erasure of data. Even further the present invention relates to a method for verifying secure erasure of data, performed on a verifier computing device, 'VCD'. Even further the present invention relates to a prover computing device, 'PCD', for providing a proof of secure erasure of data. Even further the present invention relates to a method for providing a proof of secure erasure of data, performed on a prover computing device, 'PCD'. Even further the present invention relates to a non-transitory computer readable medium storing a program causing a computer to execute a method for provably secure erasure of data. Even further the present invention relates to a method for finding a solution to a space puzzle.

BACKGROUND

Bootstrapping usually refers to the process of loading basic software into a memory of a computer after power-on or general reset, especially an operating system which will then take care of loading other software as needed. Bootstrapping is an important procedure to assessing secure environments. Whenever some security mechanism is executed, the trustful execution of all processes has to be ensured until the execution of the security mechanism happens. A trustful execution of processes is referred to as secure bootstrapping. Otherwise, a malicious process nested in the execution chain may annul the security mechanism in question and harm the system. For instance, a malicious boot loader—the BIOS does not know the difference between a malicious and a trusted boot loader, so it allows either to boot—can hijack the boot routine and conceal malicious processes from the operating system. Such a loader can suppress any off-the-shelf security mechanism and render a secure execution environment void.

There are many techniques or methods to assess a secure bootstrapping in computing environments, ranging from hardware to software-based solutions on different nodes of the execution chain, where probably TPMs are settled on the lowest layer and anti-virus software on the highest layer. In particular the initialization of secure bootstrapping is important. By initialization the stage of creating an environment is meant, which is assumed to be free from any malicious process. A system in this stage is called to be in the zero-state. If a system is bootstrapped from the zero-state, strong guarantees regarding the reliability and trustworthiness of executed processes and software are attained. A trusted computing environment can then be built on top of a chain of secure bootstrapping mechanisms.

To eliminate malicious code one can wipe out the memory (or any other persistent storage). Wipe-outs, i.e. the process of erasing data from a device, can be performed remotely and have become an essential ingredient in the security management of devices, such as smart devices and clouds, not only because they facilitate a secure installation of firmware, operating systems, and applications, but also because they often contain sensitive business data, including personally identifiable information of employees and customers, sensitive email messages, and other items. When a device is infected, lost, or stolen the potential security risk can be significant. Remote wipe-outs are the last resort to assess the confidentiality of data.

To address the problem of secure wipe outs one could use a small trusted module (e.g. tiny TPM) that halts all system processes, accesses the memory independently of the central processing unit, and overwrites the memory with '1's. Conventional methods and systems are for example disclosed in the non patent literature of Patrick Koeberl, Steffen Schulz, Ahmad-Reza Sadeghi, and Vijay Varadharajan. Trustlite: a security architecture for tiny embedded devices. In Dick C. A. Bulterman, Herbert Bos, Antony I. T. Rowstron, and Peter Druschel, editors, Ninth Eurosys Conference 2014, EuroSys 2014, Amsterdam, The Netherlands, Apr. 13-16, 2014, page 10. ACM, 2014. However, additional hardware is expensive and not applicable to all settings. Nowadays conventional off-the-shelf device management tools support software-based remote wipe-outs. Unfortunately, the underlying mechanisms give no guarantees that the deletion has indeed taken place. An adversary in control of the device might intercept the wipe-out request and fake the response. Thus, the user is left with the unsatisfying situation of trusting the device.

Conventional cryptographic proofs exist for various time problems for example disclosed in the non-patent literature of Oded Goldreich. Foundations of Cryptography: Basic Tools. Cambridge University Press, New York, N.Y., USA, 2000. Specifically, proof systems for languages that are decidable in polynomial space on a deterministic Turing machine are known as Proofs of Space (PoS), and have been disclosed e.g. in the non-patent literature of Stefan Dziembowski, Sebastian Faust, Vladimir Kolmogorov, and Krzysztof Pietrzak. Proofs of space. Cryptology ePrint Archive, Report 2013/796, 2013. http://eprint.iacr.org/. or in the non-patent literature of Giuseppe Ateniese, Ilario Bonacina, Antonio Faonio, and Nicola Galesi. Proofs of space: When space is of the essence. In Abdalla and Prisco Security and Cryptography for Networks—$9^{th}$ International Conference, SCN 2014, Amalfi, Italy, Sep. 3-5, 2014. Proceedings, volume 8642 of Lecture Notes in Computer Science (Springer, 2014), pages 538-557. In a PoS a prover convinces a verifier of the fact that it dedicated some space O(S), where S is the size of memory (polynomial in the security parameter), and her odds to consume in fact less space are negligible. In said non-patent literature of Stefan Dziembowski, Sebastian Faust, Vladimir Kolmogorov, and Krzysztof Pietrzak. Proofs of space. Cryptology ePrint Archive, Report 2013/796, 2013. http://eprint.iacr.org/ an application to online polling and the bitcoin payment system is shown.

In the non-patent literature of Daniele Perito and Gene Tsudik. Secure code update for embedded devices via proofs of secure erasure. In ESORICS, pages 643-662, 2010 PoS for provably secure wipe-outs is shown. In said non-patent literature a construction in which the verifier communicates a string of length S, and obtains a proof in form of a hashed MAC over string is described. One of the problems is that the method becomes impractical with growing S, e.g. considering a cloud with some terabytes storage capacity.

A method with reduced complexity to an order sublinear in the size of S is shown in the non-patent literature of Stefan Dziembowski, Sebastian Faust, Vladimir Kolmogorov, and Krzysztof Pietrzak. Proofs of space. Cryptology ePrint Archive, Report 2013/796, 2013. http://eprint.iacr.org/. Said method is based on graph pebbling, a technique introduced in the non-patent literature of Cynthia Dwork, Moni Naor, and Hoeteck Wee. Pebbling and proofs of work. In Victor Shoup, editor, Advances in Cryptology—CRYPTO 2005: 25th Annual International Cryptology Conference, Santa Barbara, Calif., USA, Aug. 14-18, 2005, Proceedings, volume 3621 of Lecture Notes in Computer Science, pages 37-54. Springer, 2005. The communication complexity is minimized to O(log S), but requires a preprocessing in which the prover and verifier allocate space O(S) and O(log S), respectively.

In the non-patent literature of Nikolaos P. Karvelas and Aggelos Kiayias. Efficient proofs of secure erasure. In Abdalla and Prisco Security and Cryptography for Networks—$9^{th}$ International Conference, SCN 2014, Amalfi, Italy, Sep. 3-5, 2014. Proceedings, volume 8642 of Lecture Notes in Computer Science (Springer, 2014), pages 520-537 a variant of the pebbling game with a storage complexity O(S) in the preproccesing is described, but where the verifier needs to reserve S(1) in the online phase. In the non-patent literature of Giuseppe Ateniese, Ilario Bonacina, Antonio Faonio, and Nicola Galesi. Proofs of space: When space is of the essence. In Abdalla and Prisco Security and Cryptography for Networks—$9^{th}$ International Conference, SCN 2014, Amalfi, Italy, Sep. 3-5, 2014. Proceedings, volume 8642 of Lecture Notes in Computer Science (Springer, 2014), pages 538-557. a variant of the pebbling game with O(1) verifier storage complexity is described. However said method requires the verifier to seize O(log S) space in the online phase.

SUMMARY

In an embodiment, the present invention provides a method for provably secure erasure of data, performed in a memory available to one or more computing devices, the method comprising a) generating prover state information (PSI), verifier state information (VSI), and common reference information (CRI) based on security information, a pregiven time-constraint, and a pregiven space-constraint, the generating PSI, VSI, and CRI being performed interactively between a prover computing device (PCD), and a verifier computing device, (VCD); b) computing, by the VCD based on the VSI, a challenge, c) computing a proof-of-erasure (POE) by the PCD based on the PSI and the computed challenge, the POE having a size corresponding to the pregiven space-constraint; and d) verifying by the VCD based on the VSI and the POE, wherein in a) the CRI is computed by a succinct non-interactive argument of knowledge procedure, wherein a space puzzle is computed based on a puzzle parameter (PRM) providing puzzle-specific trapdoor information (TI) and puzzle-specific verification information, (VI), wherein the PSI is computed based on the CRI and the TI, wherein the VSI is computed based on the CRI and the VI, wherein in b) the challenge is computed based on a tag computed by an evaluation of a pseudorandom tribe function with the PRM and the PRM, wherein in c) the challenge is checked if being a valid challenge from the VCD by evaluating the pseudorandom tribe function with the PRM, wherein if the challenge is valid a solution for the space puzzle is computed and the pseudorandom tribe function is evaluated with the solution resulting in a second tag, wherein the POE is generated as a zero-knowledge POE computed with the CRI, the PRM, the tags, the TI, the solution, and coins of the space puzzle, and wherein in d) the pseudorandom tribe function is evaluated with the VI and the result is compared with the second tag, and the time-constraint is checked by comparing a time needed to compute the POE with the time constraint.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 shows part of a method according to a further embodiment of the present invention;

FIG. 7 shows the find procedure according to the embodiment of the present invention of FIG. 6;

FIG. 8 shows a method for a succinct proof of secure erasure according to a further embodiment of the present invention; and FIG. 9 shows a system according to an embodiment of the present invention.

DETAILED DESCRIPTION

Figure 1:
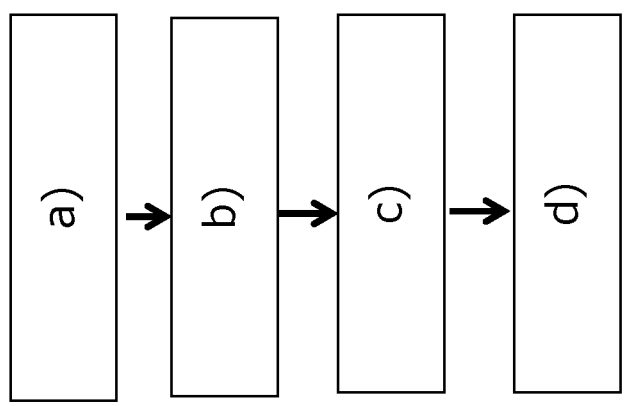
FIG. 1 shows steps of a method according to an embodiment of the present invention.

Although applicable to any kind of operational phase of a computing device, the present invention will be described with regard to bootstrapping.

Embodiments of the invention therefore address the problem of reducing computational effort, in particular with regard to space. A further problem addressed by embodiments of the invention is to reduce or even further avoid preprocessing. A further problem addressed by embodiments of the present invention is to reduce the communication complexity. A further problem addressed by embodiments of the present invention is to guarantee unforgeability and high security. A further problem addressed by embodiments of the present invention is to provide an easy implementation.

In an embodiment the present invention provides to a method for provably secure erasure of data, performed in a memory available to one or more computing devices, comprising the steps of a) Generating prover state information, 'PSI', verifier state information, 'VSI', and common reference information, 'CRI', based on security information, a pregiven time-constraint and a pregiven space-constraint said generation being performed interactively between a prover computing device, 'PCD', and a verifier computing device, 'VCD',
b) Computing a challenge by said VCD based on said VSI,
c) Computing a proof-of-erasure, 'POE', by said PCD based on said PSI and said computed challenge, said POE having a size corresponding to said space-constraint, and
d) Verifying by the VCD based on said VSI and said POE, In step a) said CRI is computed by a succinct non-interactive argument of knowledge procedure, and wherein a space puzzle is computed based on a puzzle parameter, 'PRM', providing puzzle-specific trapdoor information, 'TI' and puzzle-specific verification information, 'VI', and wherein said PSI is computed based on said CRI and said TI, and wherein said VSI is computed based on said CRI and said VI.

In step b) said challenge is computed based on a tag computed by an evaluation of a pseudorandom tribe function with said PRM and said PRM.

In step c) said challenge is checked if being a valid challenge from said VCD by evaluating said pseudorandom tribe function with said PRM, and wherein if said challenge being valid a solution for the space puzzle is computed said pseudorandom tribe function is evaluated with said solution resulting in a second tag and wherein said POE is generated as a zero-knowledge POE computed with said CRI, said PRM, said tags, said TI, said solution and coins of said space puzzle.

In step d) said pseudorandom tribe function is evaluated with said VI and the result is compared with said second tag, and said time-constraint is checked by comparing the time needed to compute said POE with said time constraint.

In a further embodiment the present invention provides to a system for provably secure erasure of data, comprising a prover computing device, 'PCD' and a verifier computing device, 'VCD', said PCD and said VCD being adapted to generate by interaction with each other prover state information, 'PSI', verifier state information, 'VSI', and common reference information, 'CRI', based on security information, a pregiven time-constraint and a pregiven space-constraint and wherein said VCD being adapted to compute a challenge based on said VSI, and to verify erasure based on said VSI and a proof-of-erasure, 'POE', and wherein said PCD is adapted to compute a proof-of-erasure, 'POE' based on said PSI and said computed challenge, said POE having a size corresponding to said space-constraint, and wherein said CRI is computed by a succinct non-interactive argument of knowledge procedure, and wherein a space puzzle is computed based on a puzzle parameter, 'PRM', providing puzzle-specific trapdoor information, 'TI' and puzzle-specific verification information, 'VI', and wherein said PSI is computed based on said CRI and said TI, and wherein said VSI is computed based on said CRI and said VI and wherein said challenge is computed based on a tag computed by an evaluation of a pseudorandom tribe function with said PRM and said PRM and wherein said challenge is checked if being a valid challenge from said VCD by evaluating said pseudorandom tribe function with said PRM, and wherein if said challenge being valid a solution for the space puzzle is computed said pseudorandom tribe function is evaluated with said solution resulting in a second tag and wherein said POE is generated as a zero-knowledge POE computed with said CRI, said PRM, said tags, said TI, said solution and coins of said space puzzle and wherein and wherein said pseudorandom tribe function is evaluated with said VI and the result is compared with said second tag said time-constraint is checked by comparing the time needed to compute said POE with said time constraint.

In a further embodiment the present invention provides to a verifier computing device, 'VCD', for verifying secure erasure of data, being adapted to generate by interaction with a prover computing device, 'PCD', prover state information, 'PSI', verifier state information, 'VSI', and common reference information, 'CRI', based on security information, a pregiven time-constraint and a pregiven space-constraint and to compute a challenge based on said VSI, and to verify erasure based on said VSI and a proof-of-erasure, 'POE', wherein said CRI is computed by a succinct non-interactive argument of knowledge procedure, and wherein a space puzzle is computed based on a puzzle parameter, 'PRM', providing puzzle-specific trapdoor information, 'TI' and puzzle-specific verification information, 'VI', and wherein said PSI is computed based on said CRI and said TI, and wherein said VSI is computed based on said CRI and said VI and wherein said challenge is computed based on a tag computed by an evaluation of a pseudorandom tribe function with said PRM and said PRM and wherein said pseudorandom tribe function is evaluated with said VI and the result is compared with a second tag provided by the PCD said time-constraint is checked by comparing the time needed to compute said POE with said time constraint.

In a further embodiment the present invention relates to a method for verifying secure erasure of data, performed on a verifier computing device, 'VCD', comprising the steps of
a1) generating by interaction with a prover computing device, 'PCD', prover state information, 'PSI', verifier state information, 'VSI', and common reference information, 'CRI', based on security information, a pregiven time-constraint and a pregiven b1) space-constraint and computing a challenge based on said VSI, and c1) verifying erasure of said data based on said VSI and a proof-of-erasure, 'POE', wherein said CRI is computed by a succinct non-interactive argument of knowledge procedure, and wherein a space puzzle is computed based on a puzzle parameter, 'PRM', providing puzzle-specific trapdoor information, 'TI' and puzzle-specific verification information, 'VI', and wherein said PSI is computed based on said CRI and said TI, and wherein said VSI is computed based on said CRI and said VI and wherein said challenge is computed based on a tag computed by an evaluation of a pseudorandom tribe function with said PRM and said PRM and wherein said pseudorandom tribe function is evaluated with said VI and the result is compared with a second tag provided by the PCD and wherein said time-constraint is checked by comparing the time needed to compute said POE with said time constraint.

In a further embodiment the present invention relates to a prover computing device, 'PCD', for providing a proof of secure erasure of data, being adapted to generate by interaction with verifier computing device, 'VCD', prover state information, 'PSI', verifier state information, 'VSI', and common reference information, 'CRI', based on security information, a pregiven time-constraint and a pregiven space-constraint, and to compute a proof-of-erasure, 'POE' based on said PSI and a challenge provided by said VCD, said POE having a size corresponding to said space-constraint, and wherein said challenge is checked if being a valid challenge from said VCD by evaluating a pseudorandom tribe function with a puzzle parameter, 'PRM', and wherein if said challenge being valid a solution for the space puzzle is computed said pseudo random tribe function is evaluated with said solution resulting in a second tag and wherein said POE is generated as a zero-knowledge POE computed with said CRI, said PRM, said tags, said TI, said solution and coins of said space puzzle.

In a further embodiment the present invention relates to a method for providing a proof of secure erasure of data, performed on a prover computing device, 'PCD', comprising the steps of a2) generating by interaction with a verifier computing device, 'VCD', prover state information, 'PSI', verifier state information, 'VSI', and common reference information, 'CRI', based on security information, a pregiven time-constraint and a pregiven space-constraint, and b2) computing a proof-of-erasure, 'POE' based on said PSI and a challenge provided by said VCD, said POE having a size corresponding to said space-constraint, and wherein said challenge is checked if being a valid challenge from said VCD by evaluating a pseudorandom tribe function with a puzzle parameter, 'PRM', and wherein if said challenge being valid a solution for the space puzzle is computed said pseudorandom tribe function is evaluated with said solution resulting in a second tag and wherein said POE is generated as a zero-knowledge POE computed with said CRI, said PRM, said tags, said TI, said solution and coins of said space puzzle.

In a further embodiment the present invention relates to a non-transitory computer readable medium storing a program causing a computer to execute a method for provably secure erasure of data, said method comprising the steps of a) Generating prover state information, 'PSI', verifier state information, 'VSI', and common reference information, 'CRI', based on security information, a pregiven time-constraint and a pregiven space-constraint said generation being performed interactively between a prover computing device, 'PCD' and a verifier computing device, 'VCD', b) Computing a challenge by said VCD based on said VSI, c) Computing a proof-of-erasure, 'POE', by said PCD based on said PSI and said computed challenge, said POE having a size corresponding to said space-constraint, and d) Verifying by the VCD based said VSI and said POE.

In step a) said CRI is computed by a succinct non-interactive argument of knowledge procedure, and wherein a space puzzle is computed based on a puzzle parameter, 'PRM', providing puzzle-specific trapdoor information, 'TI' and puzzle-specific verification information, 'VI', and wherein said PSI is computed based on said CRI and said TI, and wherein said VSI is computed based on said CRI and said VI.

In step b) said challenge is computed based on a tag computed by an evaluation of a pseudorandom tribe function with said PRM and said PRM.

In step c) said challenge is checked if being a valid challenge from said VCD by evaluating said pseudorandom tribe function with said PRM, and wherein if said challenge being valid a solution for the space puzzle is computed said pseudorandom tribe function is evaluated with said solution resulting in a second tag and wherein said POE is generated as a zero-knowledge POE computed with said CRI, said PRM, said tags, said TI, said solution and coins of said space puzzle.

In step d) said pseudorandom tribe function is evaluated with said VI and the result is compared with said second tag said time-constraint is checked by comparing the time needed to compute said POE with said time constraint.

The present invention further relates to a method for finding a solution to a space puzzle, comprising the steps of a3) generating two tables, said first table representing function values with a first argument for each index of an upper bound for the function key size and said second table representing function values with a second argument for each index of said upper bound, wherein said first argument and said second argument being different from each other, b3) sorting of the values in said first table in increasing order starting with the smallest value for some index of said upper bound c3) sorting of the values in said second table in decreasing order starting with the highest value for some index d3) checking if the sum of a value of the first table and a value of the second table is a solution to said space puzzle and if yes set said sum as solution, otherwise adapt the index of the first and/or second index value in direction to the sum and perform checking again as long as a solution has been found.

At least one embodiment of the present invention has at least one of the following advantages. Being computationally mild without having to require heavy preprocessing compared with conventional methods and systems. Reduced communication complexity compared with conventional methods and systems. Requiring reduced computational resources in particular with regard to prepare the proof and storing the result in a storage. Conventional methods and systems require to store the result permanent in storage whereas in embodiments of the present invention only some key material has to be stored. Guarantee of unforgeability in a sense that an adversary cannot force a wipe out. Enhanced security since compressibility attacks as for exampled disclosed in the non-patent literature of Claude Castelluccia, Aurélien Francillon, Daniele Perito, and Claudio Soriente. On the difficulty of software-based attestation of embedded devices. In ACM Conference on Computer and Communications Security, pages 400-409, 2009 where malicious codes compresses part of the runtime code in order to hide is disabled. Requiring only a setup stage with one round and two rounds in the online phase which is optimal. Easy implementation since only simple cryptographic operations are required.

Methods described above may be performed in a memory available to one or more computing devices, e.g. in the memory of a corresponding computing device itself.

Throughout the description the following notations and definitions are used.

If D is a probability distribution, $$d \xleftarrow{r} D$$

denotes a sampling of a value d randomly according to D.

In case S is a set, then $$s \xleftarrow{r} S$$

means that the value s is sampled according to e.g. a uniform distribution over the set S. [m] denotes the set $\{0, 1, \ldots, m-1\}$.

A function is called negligible (in the security parameter n) if it decreases faster than any polynomial poly(n) for some large enough n.

A procedure A runs in probabilistic polynomial-time (PPT) if A is randomized—uses internal random coins—and for any input $\mathcal{X} \in \{0, 1\}^*$ the computation of $A(\mathcal{X})$ terminates in at most $poly(|\mathcal{X}|)$ steps.

If the running time of a procedure is t'≈t, the distance between t' and t is meant to be negligible.

$X=\{X_n\}_{n\in N}$ and $Y=\{Y_n\}_{n\in N}$ denote two distribution ensembles.

X and Y are called (t, ε)-computationally indistinguishable if for every PPT distinguisher A with running time t, there exists a function ε(n) such that |Pr[A(X)=1]−Pr[A(Y)=1]|≤ε(n). If A is PPT and ε(n) is negligible, X and Y are (computationally) indistinguishable denoted with X≈Y.

X and Y are statistically indistinguishable if the statistical distance $\Delta(X, Y)=\Sigma \mathcal{X} |Pr[X=\mathcal{X}]-Pr[Y=\mathcal{X}]|$ is negligible.

A pseudo-random function tribe is defined as follows:

Let F: K×D→R be a family of efficient, keyed functions.

The set $K=\{K_n\}n\in \mathbb{N}$ is the set of all possible keys, $D=\{D_n\}n\in \mathbb{N}$ is the domain and $R=\{R_n\}n\in \mathbb{N}$ is the range.

A PRF tribe function ensemble with tribe key space $T=\{T_n\}n\in \mathbb{N}$ is a sequence of sets $F=\{\{F_t^{(n)}\}t\in T\}_{n\in N}$ of function families $F_t^{(n)}=\{f_k^t\}k\in K_n$ where the following two conditions hold:

Collision-Resistance: For any PPT adversary A there exists a negligible function $\epsilon_{coll}$, such that $$Pr\left[t \xleftarrow{r} T \middle| \begin{array}{c} \exists x \in D, k, k' \in K, k \neq k': \\ f_k^t(x) = f_{k'}^t(x) \end{array}\right] \leq \varepsilon_{coll(n)}$$

Pseudorandomness: For any PPT adversary, there exists a negligible function $\epsilon_{ran}$, such that $$\max_{t \in T_n} \left|Pr\left[k \xleftarrow{r} K, Af_k^{t(\cdot)}(1^n, t) = 1\right] - Pr[A^{f(\cdot)}(1^n, t) = 1]\right| \leq \varepsilon_{ran}(n)$$

where f is a randomly chosen function from the set of all functions with the domain D and range R of $F_t^{(n)}$.

$F_t^{(n)}$ is one-to-one if for every x, y there exists at most one k such that $f_k^t(x)=y$.

A non-Interactive Proof System is defined as follows:

The notion of non-interactive proof and argument systems as disclosed in the non-patent literature of Oded Goldreich. Foundations of Cryptography: Basic Tools. Cambridge University Press, New York, N.Y., USA, 2000 are herein incorporated by reference.

A non-interactive proof system Π for some language L consists of three efficient algorithms Π=(Gen, Prove, Verify) such that a) The parameter generation algorithm Gen on input a security parameter $1^n$ produces a common reference string crs along with some private verification state priv; b) The proof generation algorithm Prove on input the common reference string crs, a statement $\mathcal{X}$ and witness w, outputs a proof π; c) The proof verification algorithm Verify decides if π is a valid proof for $\mathcal{X}$, using the private verification state priv; and the following conditions holds: 1) Completeness: For all x∈L, $$Pr\left[\text{Verify}(priv, x, \pi) = 0 \middle| \begin{array}{c} (crs, priv) \leftarrow Gen(1^n) \\ \pi \leftarrow \text{Prove}(crs, x, w) \end{array}\right] = \varepsilon(n)$$

(Adaptive) Soundness: For all x∉L, for all PPT adversaries A, $$Pr\left[\text{Verify}(priv, x, \pi) = 1 \middle| \begin{array}{c} (crs, priv) \leftarrow Gen(1^n) \\ (x, \pi) \leftarrow A(1^n, crs) \end{array}\right] = \varepsilon(n)$$

A non-interactive proof system Π is an argument system, if P runs in PPT time. Π is called publicly verifiable if the private verification state is just priv=crs. Otherwise, it is called a designated-verifier argument system.

The term Knowledge Extraction is defined as follows: A non-interactive proof system Π=(Gen, Prove, Verify) is (adaptive) knowledge extractable, if for any statement $\mathcal{X}$ ∈/L, there exists a knowledge extractor E, such that for any PPT adversary $$Pr\left[\text{Verify}(priv, x, \pi) = 1 \middle| \begin{array}{c} (crs, priv) \leftarrow Gen(1^n) \\ (x, \pi) \leftarrow A(1^n, crs) \\ w \leftarrow \varepsilon(crs, x, \pi) \end{array}\right] \leq \varepsilon(n)$$

The term Succinctness is defined as follows: A non-interactive proof system Π=(Gen, Prove, Verify) is a succinct non-interactive succinct argument (SNARG) for language L, if the length of the argument π is given by |π|=O(poly(n)·log(n)). If π is a SNARG the additional knowledge verifiability property, is called a succinct non-interactive argument of knowledge (SNARK).

The term Zero-Knowledge is defined as follows: A non-interactive proof system π=(Gen, Prove, Verify) is zero-knowledge, if for all x∈L, all PPT adversaries A, there exists a simulator $S=(S_1+S_2)$, such that

|Pr[$A^{Prove(crs,\cdot,\cdot)}1^n$,priv)=1|(crs,priv)←Gen($1^n$)]−Pr[$A^{S2(crs,\tau,\cdot,\cdot)}(1^n$,priv)=1|(crs,priv,τ)←$S_1(1^n)$]|≤ε(n)

A Space Puzzle is defined as follows: A space puzzle SPuzzle is defined by four PPT procedures (Setup, Gen, Find, Verify) on space upper bound S=S(n) and time upper bound T=T (n) polynomial in the security parameter $1^n$, such that 1) The Setup (probabilistic) procedure takes as input a security parameter an generates the puzzle parameters prm. prm uniquely defines a space of puzzle and solution instances denoted as PuzSpace and SolSpace, respectively. 2) The puzzle generation (probabilistic) procedure Gen on input a security parameter $1^n$, puzzle parameters prm, a space parameter S=poly(n), and time parameter T=poly(S), samples a puzzle instance puz∈PuzSpace and generates or computes a puzzle-specific trapdoor TK and verification key VK. 3) The puzzle solving (probabilistic) procedure Find on input a security parameter $1^n$, a trapdoor key T K and a puzzle puz, computes a candidate solution sol∈SolSpace of the puzzle 4) The puzzle verification (deterministic) algorithm Verify on input the verification key VK and a solution sol, outputs a bit b∈{0, 1}, with b=1 indicating an acceptable solution and b=0 indicating an unacceptable solution.

A proof-of-erasure is defined as follows: A proof of erasure (PoE) comprises four efficient algorithms Π=(Gen, Init, Erase, Verify) running between PPT machines P (called prover) and V (called verifier) on space upper bound S=S(n) and time upper bound T=T(n) polynomial in the security parameter n, such that 1) The interactive parameter generation procedure Gen between prover P and verifier V takes as input a security parameter $1^n$, time and space constraints T and S. It outputs a prover state $SK_P$ and verifier state $SK_V$, and a common reference string crs. (it may be assumed the crs to be implicitly part of the states $SK_P$, $SK_V$. 2) The interactive procedure Init executed by the verifier V who's input is a secret state $SK_V$, outputs a challenge c. 3) The interactive procedure Erase executed by the prover P who's input is a secret state $SK_P$, and a challenge c, outputs a proof of erasure $\pi$ of size S. 4) The verification procedure Verify invoked by the verifier, on input the verification state $SK_V$, and the argument $\pi$, outputs a bit b.

Further features, advantages and further embodiments are disclosed or may be come apparent in the following:

In step d) a bit may be outputted indicating a successful verification or not. This allows in a very efficient way to provide a result of the verification.

Said space puzzle may be generated based on a one-two-one pseudorandom function tribe, 'PFT'. A pseudorandom function tribe has the advantage that it is collision-resistant.

Said space puzzle may be computed including the steps of a) Sampling at random at least two function keys out of a first PFT, said first PFT having a first size being exponential in k with basis 2, wherein k is polynomial to a security information parameter, b) Computing a second size k' such that the space constraint equals a basis 2 being exponential in k'+r+1, wherein r being polynomial to said security information parameter, c) Truncating the function keys based on the difference between the first size and the second size and including said truncated function keys in said TI d) Computing a sum of two functions having the same tribe key but different functions keys out of said at least two function keys with two different arguments sampled at random, and e) Setting said space puzzle as tuple including said computed sum, said two arguments and said tribe key.

This enables to provide in an efficient way a space puzzle with a space upper bound and a time upper bound for which the solution can be found based on said steps.

Said time constraint and said at least two function keys may be included into said VI. This enables a verification key with which a verification can be efficiently performed.

Said solution for the space puzzle may be computed by generating two tables, said first table representing function values with a first argument for each index of an upper bound for the function key size and said second table representing function values with a second argument for each index of said upper bound, wherein said first argument and said second argument being different from each other, sorting of the values in said first table in increasing order starting with the smallest value for some index of said upper bound, sorting of the values in said second table in decreasing order starting with the highest value for some index, checking if the sum of a value of the first table and a value of the second table is a solution to said space puzzle and if yes set said sum as solution.

This provides an efficient finding of a solution reducing the time complexity to $O(K' \cdot \log K')$ for the price of a significant increase of space to $O(K'R)$ where K' is the size of the key space the find procedure has to look through and R is the size of the pseudorandom tribe function's range.

If said sum is not a solution then it may be determined if the sum is smaller than the solution, then the index of the value in the second table is increased, and checking the sum with said value with increased index is performed again, if the sum is greater than the solution then the index of the value in the first table is decreased and checking of the sum with said value with decreased index is performed again.

This enables an easy and efficient search for a solution for said space puzzle.

Said secret information may be generated by computing parameters of said pseudorandom tribe function including a key space and then sampling the secret information from said key space. This enables to provide PSI and VSI including said secret information such that verification is easily for the VCD.

Said pseudorandom tribe function can be implemented as AES. This provides a reliable and simple pseudorandom tribe function.

FIG. 1 shows steps of a method according to an embodiment of the present invention. In FIG. 1 a method for provably secure erasure of data is shown. The method comprises the steps of a) Generating prover state information, 'PSI', verifier state information, 'VSI', and common reference information, 'CRI', based on security information, a pregiven time-constraint and a pregiven space-constraint said generation being performed interactively between a prover computing device, 'PCD', and a verifier computing device, 'VCD', said CRI is computed by a succinct non-interactive argument of knowledge procedure, and wherein a space puzzle is computed based on a puzzle parameter, 'PRM', providing puzzle-specific trapdoor information, 'TI' and puzzle-specific verification information, 'VI', and wherein said PSI is computed based on said CRI and said TI, and wherein said VSI is computed based on said CRI and said VI, and wherein b) Computing a challenge by said VCD based on said VSI, said challenge is computed based on a tag computed by an evaluation of a pseudorandom tribe function with said PRM and said PRM, c) Computing a proof-of-erasure, 'POE', by said PCD based on said PSI and said computed challenge, said POE having a size corresponding to said space-constraint, and said challenge is checked if being a valid challenge from said VCD by evaluating said pseudorandom tribe unction with said PRM, and wherein if said challenge being valid a solution for the space puzzle is computed said pseudorandom tribe function is evaluated with said solution resulting in a second tag and wherein said POE is generated as a zero-knowledge POE computed with said CRI, said PRM, said tags, said TI, said solution and coins of said space puzzle and wherein d) Verifying by the VCD based on said VSI and said POE, said pseudorandom tribe function is evaluated with said VI and the result is compared with said second tag, and said time-constraint is checked by comparing the time needed to compute said POE with said time constraint.

Figure 2:
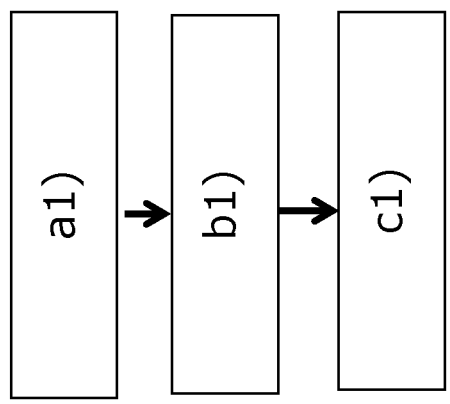
FIG. 2 shows steps of a method according to a further embodiment of the present invention.

FIG. 2 shows steps of a method according to a further embodiment of the present invention. In FIG. 2 a method for verifying a secure erasure of data performed on a verifier computing device VCD is shown. Said method comprises the steps of a1) generating by interaction with a prover computing device, 'PCD', prover state information, 'PSI', verifier state information, 'VSI', and common reference information, 'CRI', based on security information, a pregiven time-constraint and a pregiven space-constraint and b1) computing a challenge based on said VSI, and c1) verifying erasure of said data based on said VSI and a proof-of-erasure, 'POE', wherein said CRI is computed by a succinct non-interactive argument of knowledge procedure, and wherein a space puzzle is computed based on a puzzle parameter, 'PRM', providing puzzle-specific trapdoor information, 'TI' and puzzle-specific verification information, 'VI', and wherein said PSI is computed based on said CRI and said TI, and wherein said VSI is computed based on said CRI and said VI and wherein said challenge is computed based on a tag computed by an evaluation of a pseudorandom tribe function with said PRM and said PRM and wherein said pseudorandom tribe function is evaluated with said VI and the result is compared with a second tag provided by the PCD said time-constraint is checked by comparing the time needed to compute said POE with said time constraint.

Figure 3:
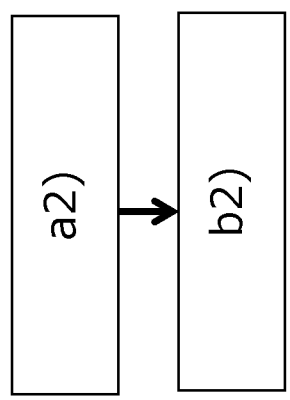
FIG. 3 shows steps of a method according to a further embodiment of the present invention.

FIG. 3 shows steps of a method according to a further embodiment of the present invention. FIG. 3 shows a method for providing a proof of secure erasure of data performed on a prover computing device PCD is shown. Said method comprises the steps of a2) generating by interaction with a verifier computing device, 'VCD', prover state information, 'PSI', verifier state information, 'VSI', and common reference information, 'CRI', based on security information, a pregiven time-constraint and a pregiven space-constraint, and b2) computing a proof-of-erasure, 'POE' based on said PSI and a challenge provided by said VCD, said POE having a size corresponding to said space-constraint, and wherein said challenge is checked if being a valid challenge from said VCD by evaluating a pseudorandom tribe function with said PRM, and wherein if said challenge being valid a solution for the space puzzle is computed said pseudorandom tribe function is evaluated with said solution resulting in a second tag and wherein said POE is generated as a zero-knowledge POE computed with said CRI, said PRM, said tags, said TI, said solution and coins of said space puzzle.

Figure 4:
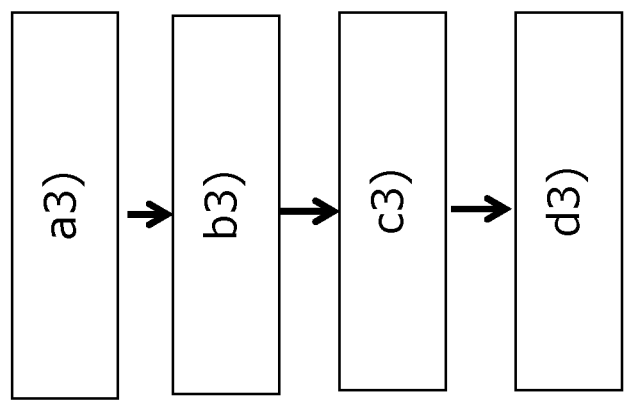
FIG. 4 shows steps of a method according to a further embodiment of the present invention.

FIG. 4 shows steps of a method according to a further embodiment of the present invention. In FIG. 4 a method for finding a solution to a space puzzle is shown. Said method comprises the steps of a3) generating two tables, said first table representing function values with a first argument for each index of an upper bound for the function key size and said second table representing function values with a second argument for each index of said upper bound, wherein said first argument and said second argument being different from each other, b3) sorting of the values in said first table in increasing order starting with the smallest value for some index of said upper bound c3) sorting of the values in said second table in decreasing order starting with the highest value for some index d3) checking if the sum of a value of the first table and a value of the second table is a solution to said space puzzle and if yes set said sum as solution, otherwise adapt the index of the first and/or second index value in direction to the sum and perform checking again as long as a solution has been found.

FIG. 5 shows part of a method according to a further embodiment of the present invention. FIG. 5 shows a worst-case complexity comparison between embodiments of the present invention and conventional methods and systems. Asymptotic notation is used where S is proportional to the number of allocated memory blocks, polynomial in the security parameter. The column denoted with T represents the time constraint and the column with S represents the space constraint. OWF denotes one way function for the security and ROM denotes random oracle model. As it can be seen embodiments of the present invention only require one round of a setup stage and two rounds in the proof generation phase. Further a prover and/or verifier during proof generation requires less computational effort compared to conventional methods and systems.

Figure 6:
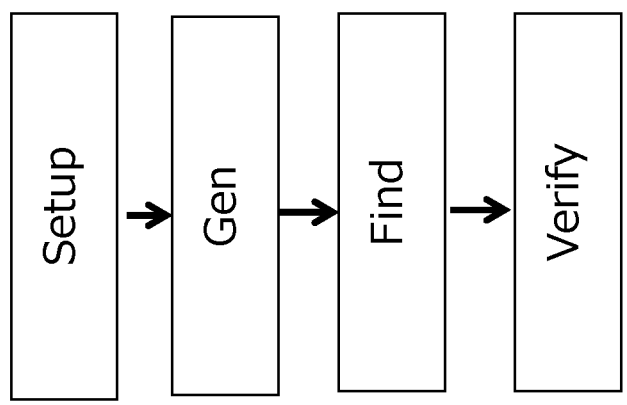
FIG. 6 shows part of a method according to a further embodiment of the present invention.

FIG. 6 shows part of a method according to a further embodiment of the present invention.

The steps show procedures for providing a space puzzle, the procedures Setup, Gen, Find and Verify on a space upper bound S and a time upper bound T both being polynomial in a security parameter n.

In general the setup procedure takes as input a security parameter $1^n$, and generates the puzzle parameters prm. prm uniquely defines a space of puzzle and solution instances denoted as PuzSpace and SolSpace in the following, respectively.

The puzzle generation (probabilistic) procedure Gen on input a security parameter $1^n$, puzzle parameters prm, a space parameter S=poly(n), and time parameter T=poly(S), samples a puzzle instance puz ∈ PuzSpace and generates a puzzle-specific trapdoor TK and verification key VK.

The puzzle solving (probabilistic) procedure Find on input a security parameter a trapdoor key TK and a puzzle puz, computes a candidate solution sol ∈ SolSpace of the puzzle.

The puzzle verification (deterministic) procedure Verify on input the verification key VK and a solution sol, outputs a bit b∈{0, 1}, with b=1 indicating an acceptable solution and b=0 indicating an unacceptable solution.

The Space Puzzle S has deterministic solutions, if for all S, T, for all prm←Setup($1^n$), for all (TK, VK, puz)←Gen($1^n$, prm, S, T), and all sol←Find($1^n$, TK, puz), it holds that Verify(VK, sol)⇔ VK sol.

In detail said Setup procedure may be performed as follows:

Setup($1_n$): The setup algorithm invokes ($T_F$, $K_F$, $D_F$, $R_F$)←Gen($1^n$) and obtains the parameters of the pseudorandom function tribe. It outputs the tuple prm=($T_F$, $K_F$, $R_F$). The size of $K_F$ may $K=2^k$ and the size of $R_F$ may be $R=2^r$ (for some k, r polynomial in the security parameter n).

In detail the Gen procedure may be performed as follows:

Gen($1^n$, S, T, prm): The parameter generation procedure chooses a tribe key t←$T_F$ and a pair ($x_0$, $x_1$)←$D_F$ at random. Next, it samples function keys ($k_0$, $k_1$)←$K_F$ at random. Let ($k_0^{k'}$, $k_1^{k'}$) be the truncated keys denoting the first k'-bits of ($k_0$, $k_1$), such that $2^{k+r+1}$=S. Set the remaining k-k' bits as the trapdoor TK=($k_0^{k-k'}$, $k_1^{k-k'}$). The algorithm computes z=($f_{k0}^t$($x_0$)+$f_{k1}^t$($x_1$)), and sets the puzzle as puz=(t, $x_0$, $x_1$, z). It stores the verification key VK=($k_0$, $k_1$, T).

In detail the Find procedure may be performed as follows:

Find($1^n$, TK, puz): On input a trapdoor TK=($k_0^{k-k'}$, $k_1^{k-k'}$) and a challenge puz=(t, $x_0$, $x_1$, z), the puzzler runs the procedure, described in FIG. 7, to find the first k' bits of the keys sol=($k_0$, $k_1$).

In detail the Verify procedure may be performed as follows:

Verify(VK, sol): The generator accepts the solution tuple sol=($k_0^*$, $k_1^*$) if and only if sol=($k_0$, $k_1$) and the prover did not use time t≤T to compute the proof.

FIG. 7 shows the find procedure in detail based on FIG. 6.

In FIG. 7 two tables $T_0$, $T_1 \in K_F \times R_F$ are maintained: Table $T_0$ stores for each k∈(1, ..., K') the function value $$f^t_{k \| k_0^{k-k'}}(x_0)$$

and in the same way we build up $T_1$ by computing $$f^t_{k \| k_1^{k-k'}}(x_2)$$

on input $x_1$. Given these tables, the Find procedure, described in FIG. 7, does the following: It sorts $T_0$ in increasing order starting with the smallest value of $$f^t_{i\|k_0^{k-k'}}(x_0)$$

for some i∈K' and sorts $T_1$ in decreasing order, starting with the greatest value of $$f^t_{i\|k_1^{k-k'}}(x_1)$$

for some i∈K'. Suppose now that $(\tilde{k}_0, \tilde{y}_0)$, $(\tilde{x}_1, \tilde{y}_1)$ are the two first elements in $T_0$, $T_1$. In case $\tilde{y}_0+\tilde{y}_1=z$ a solution is found; on the other hand if $\tilde{y}_0+\tilde{y}_1>z$; the next element of table $T_1$ is considered if $\tilde{y}_0+\tilde{y}_1<z$, the next element of $T_0$ is considered.

Compared with conventional procedures and with regard to complexity, William's algorithm as disclosed in the non-patent literature of J. W. J. Williams, Algorithm 232: Heapsort. Communications of the ACM, 7(6):347348, 1964 requires average-case and worst-case time $T_{sort}=O(K \cdot \log K)$ and constant space $S_{sort}=O(1)$ to sort a list of K elements. In addition, Horowitz's comparison technique as disclosed in the non-patent literature of Ellis Horowitz and Sartaj Sahni, Computing partitions with applications to the knapsack problem, J. ACM, 21(2): 277-292, 1974 to find a matching tuple requires on average $T_{find}=O(K)$ and constant space $S_{find}=O(1)$.

On average the Find procedure shown in FIG. 7 runs in superarithmetic time and linear space.

FIG. 8 shows a method for a succinct proof of secure erasure according to a further embodiment of the present invention.

Said proof of erasure comprises four procedures Gen, Init, Erase and Verify running between PPT machines prover and verifier on a space upper bound S and a time upper bound T being polynomial in the security parameter.

The interactive parameter generation procedure Gen takes as input a security parameter $1^n$, time and space constraints T and S. It outputs a prover state $SK_P$ and verifier state $SK_V$, and a common reference string crs. The common reference string crs is here assumed to be implicitly part of the states $SK_P$, $SK_V$.

The interactive algorithm Init executed by the verifier V who's input is a secret state $SK_V$, outputs a challenge c.

The interactive algorithm Erase executed by the prover P who's input is a secret state $SK_P$, and a challenge c, outputs a proof of erasure π of size S.

The verification algorithm Verify invoked by the verifier, on input the verification state $SK_V$, and the argument π, outputs a bit b.

In more detail and with the following further definitions: SNARK=(Gen, Prove, Verify) is a publicly-verifiable succinct non-interactive argument of knowledge. SPuzzle=(Setup, Gen, Find, Verify) is a space puzzle for time T and space S with deterministic solutions and PRF=(Gen, F) denotes a pseudorandom function family, the procedures for said proof of erasure may be provided as follows:

Gen($1^n$, T, S): Invoking crs←SNARK.Gen($1^n$) to compute a common reference string. Setting up a space puzzle prm SPuzzle.Setup($1^n$). Compute a puzzle (TK, VK, puz) ←SPuzzle.Gen($1^n$, prm). Compute a secret key by first computing the parameters of the pseudorandom function (K, D, R)←PRF.Gen($1^n$) and then uniformly sampling the seed $$k \xleftarrow{r} K$$

from the key space K. Set $SK_P$=(crs, k, TK) and $SK_V$=(crs, k, VK, puz).

Init ($SK_V$): Computing a tag $\tau_1 \rightarrow$PRF.F(k, puz) by evaluating the pseudorandom function with key k on input puz. Sending the tuple c=(puz, $\tau_1$) to the prover.

Erase ($SK_P$, c): Upon receiving the tuple (puz, $\tau_1$), checking that puz is a valid challenge from the verifier, and abort if PRF.F(k, puz)≠$\tau_1$. Otherwise, finding a solution for the puzzle sol←SPuzzle Find($1^n$, VK, puz) and compute a solution tag $\tau_2 \rightarrow$PRF.F(k, sol). Generating a zero-knowledge proof of knowledge π←SNARK.Prove(crs, $\mathcal{X}$, w) for the language L defined as $$L = \left\{ x = (puz, \tau_1, \tau_2): \begin{array}{c} \exists w = (k, r, TK, sol) \text{ s.t.} \\ PRF.F(k, puz) = \tau_1 \\ sol \leftarrow SPuzzle.Find(r, TK, puz) \\ PRF.F(k, sol) = \tau_2 \end{array} \right\}$$

where r are the coins to find the solution of the puzzle Sending the proof π along the tag $\tau_2$ to the verifier.

Verify ($SK_V$, r): Upon receiving the response r=(π, $\tau_2$), returning 1, if t≤T and SNARK.Verify(crs, $\mathcal{X}$, π)=1 and $$PRF.F(k, VK) \overset{!}{=} \tau_2.$$

The above procedures provide strong soundness and privacy in the sense of a proof of knowledge. If the space puzzle is provided such there is only a single solution to each pair of tags, the proof may be obtained by simply sending the pair (s, $\tau_s$) where s←PRF(K, s) authenticates the message with the shared key. This enables a more efficient implementation. Embodiments of the present invention fulfil the above criteria and produce single solutions except with negligible probability.

FIG. 9 shows a system according to an embodiment of the present invention. In FIG. 9 two computing devices, a PCD and a VCD are shown, being connected with each other, for example via the internet. The PCD comprises a memory M which should be erased. Said erasure or wipe-out has to be proved by the VCD, which wants to make sure that the memory is free of malware for instance. The PCD and the VCD then perform interactively the steps shown in FIG. 1. The space constraint is selected such that it corresponds to the size of the memory of the PCD to be erased.

To summarize at least one embodiment of the present invention provides a space puzzle and a proof of erasure based on computationally mild space problems compared with conventional methods and systems.

Further at least one embodiment of the present invention requires no preprocessing compared with conventional methods and systems. Said embodiment(s) of the present invention only need to store some key material.

Even further at least one embodiment of the present invention guarantees a proof of erasure with unforgeability in the sense when an adversary or any non-authorized party cannot force a wipe-out.

Further at least one embodiment of the present invention provides a proof of erasure being uncompressible in the sense that the two tables generated by a prover have high-min entropy and hence compressibility attacks as for example disclosed in the non-patent literature of Claude Castelluccia, Aurelien Francillon, Daniele Perito, and Claudio Soriente. On the difficulty of software-based attestation of embedded devices. In ACM Conference on Computer and Communications Security, pages 400-409, 2009 where malicious codes compresses part of the runtime code in order to hide are disabled.

At least one embodiments of the present invention further requires only one setup stage, one round, and two rounds in the online phase thus is being optimal.

Even further at least one embodiment of the present invention requires only simple cryptographic operations, for example pseudorandom function like AES is sufficient.

The present invention enables to provide in general a cryptographic toolbox comprising a non-interactive argument and a pseudorandom function family, a method for sorting, a method for searching and a method to keep the secret K unextractable from the verifier. In other words the computation of the secret key family by the verifier does not leak the secret key. For example this can be a tiny (TPM, a physical uncloneable function PUF or SIM card with secure storage and minimal cryptographic requirements like a pseudorandom function implementation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for provably secure erasure of data, performed in a memory available to one or more computing devices, the method comprising:
   a) generating prover state information (PSI), verifier state information (VSI), and common reference information (CRI) based on security information, a pregiven time-constraint, and a pregiven space-constraint, the generating the PSI, the VSI, and the CRI being performed interactively between a prover computer (PCD) and a verifier computer (VCD),
   b) computing, by the VCD based on the VSI, a challenge,
   c) computing a proof-of-erasure (POE) by the PCD based on the PSI and the computed challenge, the POE having a size corresponding to the pregiven space-constraint, and
   d) verifying, by the VCD based on the VSI and the POE, erasure of the data,
   wherein in a) the CRI is computed by a succinct non-interactive argument of knowledge procedure,
   wherein a space puzzle is computed based on a puzzle parameter (PRM) providing puzzle-specific trapdoor information (TI) and puzzle-specific verification information (VI),
   wherein the PSI is computed based on the CRI and the TI,
   wherein the VSI is computed based on the CRI and the VI,
   wherein in b) the challenge is computed based on a tag computed by an evaluation of a pseudorandom tribe function with the PRM and the PRM,
   wherein in c) the challenge is checked if being a valid challenge from the VCD by evaluating the pseudorandom tribe function with the PRM,
   wherein if the challenge is valid, a solution for the space puzzle is computed and the pseudorandom tribe function is evaluated with the solution resulting in a second tag,
   wherein the POE is generated as a zero-knowledge POE computed with the CRI, the PRM, the tags, the TI, the solution, and coins of the space puzzle, and
   wherein in d) the pseudorandom tribe function is evaluated with the VI and the result is compared with the second tag, and the time-constraint is checked by comparing a time needed to compute the POE with the time constraint.

2. The method according to claim 1, wherein in d) a bit is outputted indicating a successful verification or not.

3. The method according to claim 1, wherein the space puzzle is generated based on a one-to-one pseudorandom function tribe (PFT).

4. The method according to claim 3, wherein the computing the space puzzle comprises:
   sampling at random at least two function keys out of a first PFT, the first PFT having a first size being exponential in k with basis 2, wherein k is polynomial to a security information parameter,
   computing a second size k' such that a basis 2 being exponential in k'+r+1, wherein r being polynomial to the security information parameter, equals the space constraint,
   truncating the function keys based on the difference between the first size and the second size and including the truncated function keys in the TI
   computing a sum of two functions having the same tribe key but different functions keys out of the at least two function keys with two different arguments sampled at random, and
   setting said space puzzle as tuple including the computed sum, the two arguments and the tribe key.

5. The method according to claim 4, wherein the time constraint and the at least two functions keys are included into the VI.

6. The method according to claim 1, wherein the computing the solution for the space puzzle comprises:
   generating two tables, a first table representing function values with a first argument for each index of an upper bound for a function key size and a second table representing function values with a second argument for each index of the upper bound, wherein the first argument and the second argument are different from each other,
   sorting values in the first table in increasing order starting with a smallest value for some index of the upper bound,
   sorting values in the second table in decreasing order starting with a highest value for some index, and checking if a sum of a value of the first table and a value of the second table is a solution to the space puzzle and if yes setting the sum as a solution.

7. The method according to claim 6, wherein if the sum is not a solution, the computing the solution for the space puzzle comprises:
if the sum is smaller than the solution, increasing the index of the value in the second table and performing checking the sum with the value with increased index,
if the sum is greater than the solution, decreasing the index of the value in the first table and performing checking of the sum with the value with decreased index.

8. The method according to claim 3, wherein secret information is generated by computing parameters of the pseudorandom tribe function including a key space and then sampling the secret information from the key space.

9. A system for provably secure erasure of data, the system comprising:
a prover computer (PCD) and a verifier computer (VCD), the PCD and the VCD being configured to collectively execute one or more programs stored at computer readable media, wherein execution of the one or more programs by the PCD and the VCD causes the PCD and the VCD to perform a method for verifying secure erasure of data, the method comprising:
generating, by interaction between the PCD and the VCD, prover state information (PSI), verifier state information (VSI), and common reference information (CRI) based on security information, a pregiven time-constraint and a pregiven space-constraint;
computing, by the VCD based on the VSI, a challenge,
computing, bv the PCD a proof-of-erasure (POE) based on the PSI and the computed challenge, wherein the POE has a size corresponding to the space-constraint, and
verifying by the VCD based on the VSI and the POE, erasure of the data,
wherein the CRI is generated by a succinct non-interactive argument of knowledge procedure,
wherein a space puzzle is computed based on a puzzle parameter (PRM), providing puzzle-specific trapdoor information (TI) and puzzle-specific verification information (VI),
wherein the PSI is computed based on the CRI and the TI,
wherein the VSI is computed based on the CRI and the VI,
wherein the challenge is computed based on a tag computed by an evaluation of a pseudorandom tribe function with the PRM and the PRM,
wherein the computing the POE comprises determining whether the challenge is a valid challenge from the VCD by evaluating the pseudorandom tribe function with the PRM,
wherein if the challenge is valid, a solution for the space puzzle is computed and the pseudorandom tribe function is evaluated with the solution resulting in a second tag,
wherein the POE is generated as a zero-knowledge POE computed with the CRI, the PRM, the tags, the TI, the solution, and coins of the space puzzle, and
wherein the pseudorandom tribe function is evaluated with the VI and the result is compared with the second tag, and the time-constraint is checked by comparing the time needed to compute the POE with the time constraint.

10. A verifier computer (VCD) for verifying secure erasure of data, the VCD being configured to execute one or more programs stored at computer readable media, wherein execution of the one or more programs by the VCD causes the VCD to perform method for verifying secure erasure of data, the method comprising:
generating, by interaction with a prover computer (PCD), prover state information (PSI), verifier state information (VSI), and common reference information (CRI) based on security information, a pregiven time-constraint, and a pregiven space-constraint,
computing a challenge based on the VSI, and
verifying erasure of the data based on the VSI and a proof-of-erasure (POE),
wherein the CRI is computed by a succinct non-interactive argument of knowledge procedure,
wherein a space puzzle is computed based on a puzzle parameter (PRM), providing puzzle-specific trapdoor information (TI) and puzzle-specific verification information (VI),
wherein the PSI is computed based on the CRI and the TI,
wherein the VSI is computed based on the CRI and the VI,
wherein the challenge is computed based on a tag computed by an evaluation of a pseudorandom tribe function with the PRM and the PRM, and
wherein the pseudorandom tribe function is evaluated with the VI and the result is compared with a second tag provided by the PCD, the time-constraint is checked by comparing the time needed to compute the POE with the time constraint.

11. A method for verifying secure erasure of data, performed on a verifier computing device (VCD), the method comprising:
a) generating, by interaction with a prover computing device (PCD), prover state information (PSI), verifier state information (VSI), and common reference information (CRI) based on security information, a pregiven time-constraint, and a pregiven space-constraint,
b) computing a challenge based on the VSI, and
c) verifying erasure of the data based on the VSI and a proof-of-erasure (POE), wherein the CRI is computed by a succinct non-interactive argument of knowledge procedure,
wherein a space puzzle is computed based on a puzzle parameter (PRM), providing puzzle-specific trapdoor information (TI) and puzzle-specific verification information (VI), and
wherein the PSI is computed based on the CRI and the TI,
wherein the VSI is computed based on the CRI and the VI,
wherein the challenge is computed based on a tag computed by an evaluation of a pseudorandom tribe function with the PRM and the PRM, and
wherein the pseudorandom tribe function is evaluated with the VI and the result is compared with a second tag provided by the PCD, and the time-constraint is checked by comparing the time needed to compute the POE with the time constraint.

12. A prover computer (PCD), for providing a proof of secure erasure of data, the PCD being configured to execute one or more programs stored at computer readable media, wherein execution of the one or more programs by the PCD causes the PCD to perform a method for verifying secure erasure of data, the method comprising:
generating, by interaction with verifier computing device (VCD), prover state information (PSI), verifier state information (VSI), and common reference information (CRI) based on security information, a pregiven time-constraint, and a pregiven space-constraint, and computing a proof-of-erasure (POE) based on the PSI and a challenge provided by the VCD, the POE having a size corresponding to the space-constraint, wherein the VCD verifies, based on the VSI and the POE, erasure of the data, wherein the CRI is generated by a succinct non-interactive argument of knowledge procedure, wherein a space puzzle is computed based on a puzzle parameter (PRM), providing puzzle-specific trapdoor information (TI) and puzzle-specific verification information (VI), wherein the PSI is computed based on the CRI and the TI, wherein the VSI is computed based on the CRI and the VI, wherein the challenge is computed based on a tag computed by an evaluation of a pseudorandom tribe function with the PRM and the PRM, wherein the computing the POE comprises determining whether the challenge is a valid challenge from the VCD by evaluating the pseudorandom tribe function with the PRM, wherein if the challenge is valid, a solution for a space puzzle is computed, and the pseudorandom tribe function is evaluated with the solution resulting in a second tag, and wherein the POE is generated as a zero-knowledge POE computed with the CRI, the PRM, the tags, the TI, the solution and coins of the space puzzle, and wherein the pseudorandom tribe function is evaluated with the VI and the result is compared with the second tag, and the time-constraint is checked by comparing the time needed to compute the POE with the time constraint.

13. A method for providing a proof of secure erasure of data, performed on a prover computing device (PCD), the method comprising:

a) generating by interaction with a verifier computing device (VCD), prover state information (PSI), verifier state information (VSI), and common reference information (CRI) based on security information, a pregiven time-constraint, and a pregiven space-constraint, and b) computing a proof-of-erasure (POE) based on the PSI and a challenge provided by the VCD, the POE having a size corresponding to the space-constraint, wherein the VCD verifies, based on the VSI and the POE, erasure of the data, wherein the CRI is generated by a succinct non-interactive argument of knowledge procedure, wherein a space puzzle is computed based on a puzzle parameter (PRM), providing, puzzle-specific trapdoor information (TI) and puzzle-specific verification information (VI), wherein the PSI is computed based on the CRI and the TI, wherein the VSI is computed based on the CRI and the VI, wherein the challenge is computed based on a tag computed by an evaluation of a pseudorandom tribe function with the PRM and the PRM, wherein the computing the POE comprises determining whether the challenge is a valid challenge from the VCD by evaluating the pseudorandom tribe function with the PRM, wherein if the challenge is valid a solution for a space puzzle is computed and the pseudorandom tribe function is evaluated with the solution resulting in a second tag, wherein the POE is generated as a zero-knowledge POE computed with the CRI, the PRM, the tags, the TI, the solution, and coins of the space puzzle, and wherein the pseudorandom tribe function is evaluated with the VI and the result is compared with the second tag, and the time-constraint is checked by comparing the time needed to compute the POE with the time constraint.

14. A non-transitory computer readable medium storing a program causing a computer to execute a method for provably secure erasure of data, the method comprising:

a) generating prover state information (PSI), verifier state information (VSI), and common reference information (CRI) based on security information, a pregiven time-constraint, and a pregiven space-constraint, the generating PSI, VSI, and CRI is being performed interactively between a prover computing device (PCD), and a verifier computing device, (VCD), b) computing, by the VCD based on the VSI, a challenge, c) computing a proof-of-erasure (POE) by the PCD based on the PSI and the computed challenge, the POE having a size corresponding to the pregiven space-constraint, and d) verifying, by the VCD based on the VSI and the POE, erasure of the data, wherein in a) the CRI is computed by a succinct non-interactive argument of knowledge procedure, wherein a space puzzle is computed based on a puzzle parameter (PRM) providing puzzle-specific trapdoor information (TI) and puzzle-specific verification information,(VI), wherein the PSI is computed based on the CRI and the TI, wherein the VSI is computed based on the CRI and the VI, wherein in b) the challenge is computed based on a tag computed by an evaluation of a pseudorandom tribe function with the PRM and the PRM, wherein in c) the challenge is checked if being a valid challenge from the VCD by evaluating the pseudorandom tribe function with the PRM, wherein if the challenge is valid a solution for the space puzzle is computed and the pseudorandom tribe function is evaluated with the solution resulting in a second tag, wherein the POE is generated as a zero-knowledge POE computed with the CRI the PRM, the tags, the TI, the solution, and coins of the space puzzle, and wherein in d) the pseudorandom tribe function is evaluated with the VI and the result is compared with the second tag, and the time-constraint is checked by comparing a time needed to compute the POE with the time constraint.

* * * * *